United States Patent [19]

Unger et al.

[11] Patent Number: 4,606,602

[45] Date of Patent: Aug. 19, 1986

[54] SELECTIVELY DISPERSIVE OPTICAL WAVEGUIDE FILMS

[75] Inventors: Hans-Georg Unger; Jörn Jacob, both of Brunswick, Fed. Rep. of Germany

[73] Assignee: Ant Nachrichtentechnik, Backnang, Fed. Rep. of Germany

[21] Appl. No.: 445,995

[22] Filed: Dec. 1, 1982

[30] Foreign Application Priority Data

Dec. 1, 1981 [DE] Fed. Rep. of Germany ....... 3147488

[51] Int. Cl.$^4$ .................................................. G02B 6/26
[52] U.S. Cl. ............................. 350/96.12; 350/96.15; 350/96.17; 350/96.19
[58] Field of Search ............... 350/96.11, 96.12, 96.15, 350/96.16, 96.17, 96.18, 96.19

[56] References Cited

U.S. PATENT DOCUMENTS

| 3,614,198 | 10/1971 | Martin | 350/96.18 |
| 3,957,341 | 5/1976 | Taylor | 350/96.12 |
| 4,141,621 | 2/1979 | Aagard et al. | |
| 4,183,617 | 1/1980 | Isaacs | |
| 4,261,639 | 4/1981 | Kogelnik et al. | 350/96.15 |
| 4,279,464 | 7/1981 | Colombini | 350/96.19 |
| 4,300,930 | 11/1981 | Chang | 350/96.3 |
| 4,402,570 | 9/1983 | Chang | 350/96.3 |
| 4,453,801 | 6/1984 | Verber et al. | 350/96.12 |

FOREIGN PATENT DOCUMENTS 1108903  9/1981  Canada .

OTHER PUBLICATIONS

Ashley et al., Appl. Phys. Lett., vol. 33, No. 6, Sep. 15, 1978, "Fresnel Lens in a Thin-Film Waveguide", pp. 490–492.

P. K. Tien, Applied Optics, vol. 10, No. 11, Nov. 1971, "Light Waves in Thin Films and Integrated Optics", pp. 2395–2413.

Unger, *Planar Optical Waveguides and Fibres*, Clarendon Press, Oxford, 1977, pp. 58–83.

Chang et al., "Fresnel Lenses in Optical Waveguides", IEEE Journal of Quantum Electronics, vol. QE-16, No. 7, 7/80, pp. 744–754.

*Primary Examiner*—William L. Sikes
*Assistant Examiner*—Frank González

[57] ABSTRACT

Planar waveguide film structure for an integrated optical system, composed of: a carrier substrate having a first index of refraction $n_S$; a film having a selected thickness D and a second index of refraction $n_F$ greater than the first index of refraction applied onto the substrate for substantially guiding light waves; and a localized optically effective coating applied to the film, the coating having an index of refraction $n_A$ and a thickness d such that the following conditions apply:

$$0.05\ D < d < 1.00\ D$$

$$n_S < n_F < n_A.$$

18 Claims, 7 Drawing Figures

SELECTIVELY DISPERSIVE OPTICAL WAVEGUIDE FILMS

BACKGROUND OF THE INVENTION

The present invention relates to a planar waveguide film member for integrated optical systems, of the type including a carrier substrate having a certain index of refraction on which is applied a film having a greater index of refraction to substantially guide the waves.

Optical waves are used as signal carriers in the optical communications art. Currently, the most important transmitters are semiconductor lasers and the most important receivers are photodiodes. A light conductive fiber is used as the transmission medium and operates as a dielectric waveguide to propagate the light radiation, or waves. This technique of pure transmission of communications signals requires, of course, at the transmitting and at the receiving end, components which can process the respective communications signals in a suitable manner.

To obtain the advantages of broadband and low dispersion transmissions over the light-conductive fibers with such components as well, there exists the requirement that these components likewise have low dispersion. Therefore, they are usually constructed as planar waveguide films because this technique permits the required waveguides and components to be easily produced in an integrated manner.

SUMMARY OF THE INVENTION

It is an object of the present invention to provide waveguides and/or components for integrated optical systems wherein such waveguides and/or components have very low attenuation, can be manufactured relatively easily and can be adapted to the respective signal processing requirements.

The above and other objects are achieved, according to the invention, by the provision of a planar waveguide film structure for an integrated optical system, comprising: a carrier substrate having a first index of refraction $n_S$; a film having a selected thickness D and a second index of refraction $n_F$ greater than the first index of refraction applied onto said substrate for substantially guiding light waves; and a localized optically effective coating applied to said film, said coating having an index of refraction $n_A$ and a thickness d such that the following conditions apply:

$$0.05D < d < 1.00D$$

$$n_S < n_F < n_A.$$

Further features of the invention will be described below. The invention will now be explained in greater detail with reference to various embodiments.

DESCRIPTION OF THE PREFERRED EMBODIMENTS

Figure 1:
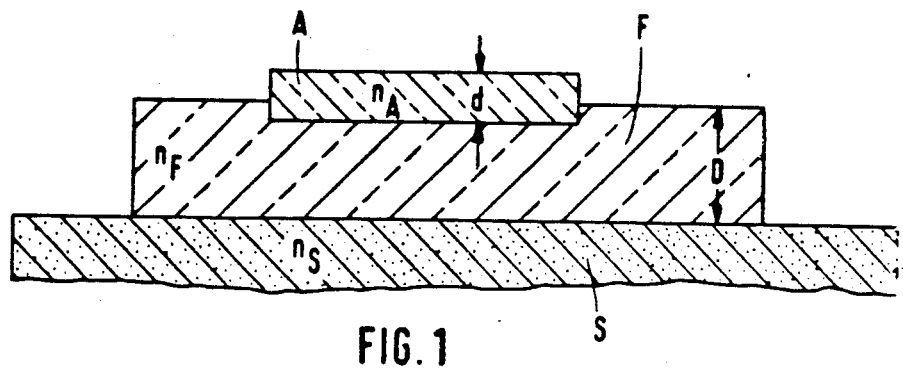
FIG. 1 is a cross-sectional side view of one preferred embodiment of a waveguide film structure according to the invention.

FIG. 1 is a cross-sectional view of a waveguide film member constructed according to the invention. It includes a substrate S having the index of refraction $n_S$ and serving as the carrier for a film F through which the lightwaves are essentially conducted. Film F has a thickness D and an associated index of refraction $n_F$. In the illustrated embodiment, an optically effective coating A which is relatively thin is placed onto film F. Coating A has a thickness d and an index of refraction $n_A$. This coating A, if dimensioned properly, gives the illustrated waveguide film low dispersion.

Coating A can be applied to film F to extend in the longitudinal direction of the film strip, i.e. perpendicular to the plane of FIG. 1. Furthermore, coating A can be completely embedded into film F so that the exposed surface of coating A is flush, i.e. its surface forms a continuous plane with, the surface of film F. In the illustrated embodiment, coating A is only partially embedded in film F. If the following relations are established, the resulting dispersion behavior of the member is uniform over the broadest possible frequency band:

$$0.05D < d \leq 1.00D$$

$$n_S < n_F < n_A.$$

Within the scope of the above conditions it is possible to make the waveguide film together with its coating either low in dispersion or highly dispersive. In the latter case, the waveguide film with coating may be used in a film prism for spectral separation and may be employed in multiplexers or demultiplexers.

Figure 2:
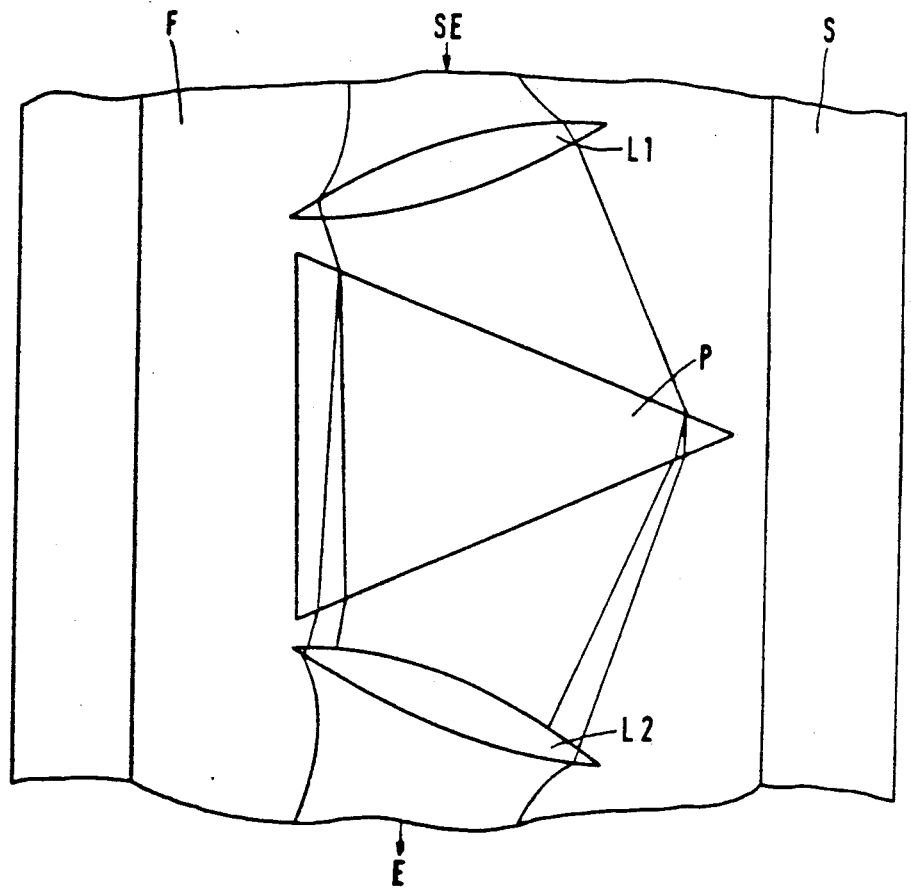
FIG. 2 is a plan view of a waveguide component according to the invention.

FIG. 2 shows a particular embodiment of a device according to the invention. A film F is again applied onto a substrate S as in FIG. 1. In order to produce components which influence the propagation of light in the desired manner, one coating A of this embodiment is designed on film F in the form of a lens L1. Further in FIG. 2 a coating A as shown in FIG. 1 is provided in the form of a prism P. The above mentioned limit values apply for the parameters of each component. To again restrict the transverse spreading of the lightwave after it passes the prism P, a further lens L2 identical to lens L1 is placed onto the arrangement shown in FIG. 2. Thus, a wave deflector, multiplexer or demultiplexer can be constructed on the waveguide film F with elements L1, P and L2.

The light signal to be processed at a point SE may be fed into the arrangement by a suitable transmitter. Within the arrangement, the path of the waves is indicated by lines extending between components L1, P and L2. At the exit point E of the arrangement, the individual channels of the transmitted frequency band which have been fed in at SE can be coupled out.

Figure 3:
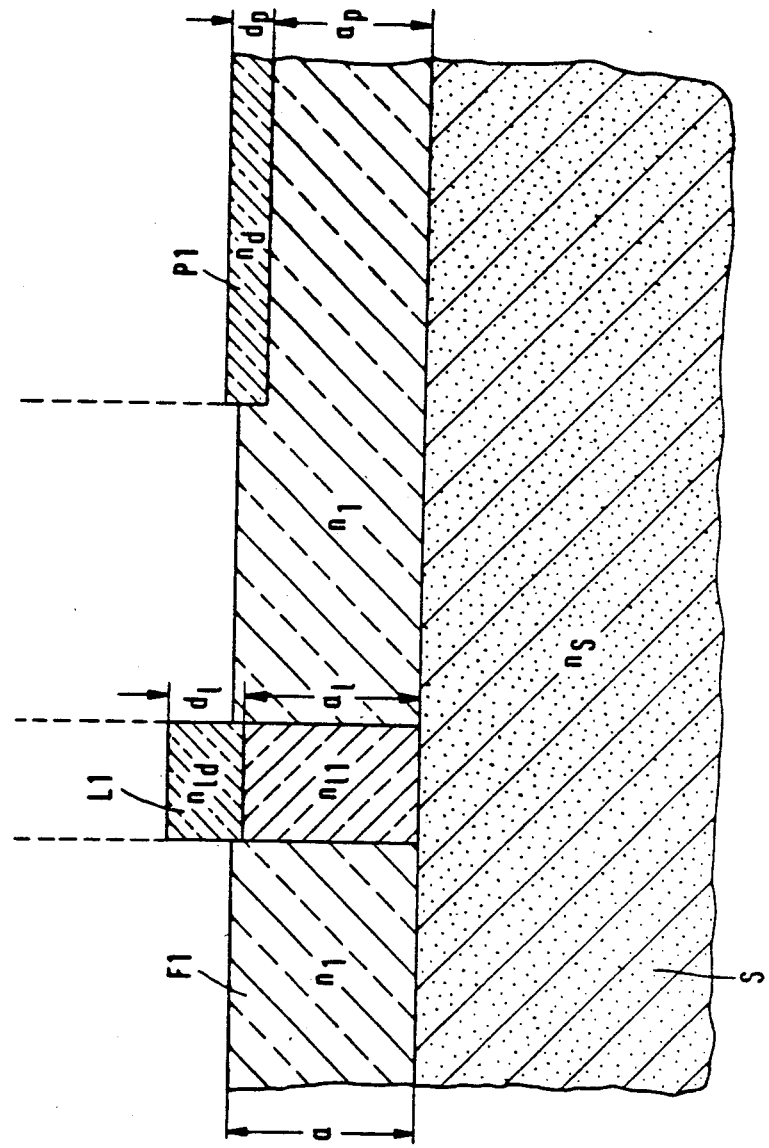
FIG. 3 is a cross-sectional side view of another preferred embodiment of the invention.

FIG. 3 is a longitudinal sectional view of a prism coupler in film technique according to the invention. The basic film F1 having the index of refraction $n_1$ is again applied to a carrier substrate S having the index of refraction $n_S$. Film F1 has a thickness a. It is given such dimensions that the waveguide film has the lowest possible dispersion. At a suitable location, the basic film F1 is interrupted by a lens-shaped section L1 which can have the form shown in FIG. 2. This section includes a lower film portion having a thickness $a_1$ and an index of refraction $n_{1l}$ and an upper film portion having a thickness $d_1$ and an index of refraction $n_{1d}$. The upper lens portion is in part embedded in basic film F1 and in part projects above that film. At the right-hand end of the illustrated waveguide film F1, a further film embedded partially in the film waveguide F1 and having the shape of a prism creates a prism P1 with the index of refraction $n_d$ and a film thickness $d_p$. The thickness of the waveguide film F1 underneath the prism P1 is $a_p$.

According to the invention the structure in FIG. 3 can be dimensioned as follows:

The substrate S has the index of refraction $n_s = 1.40$.

Figure 5:
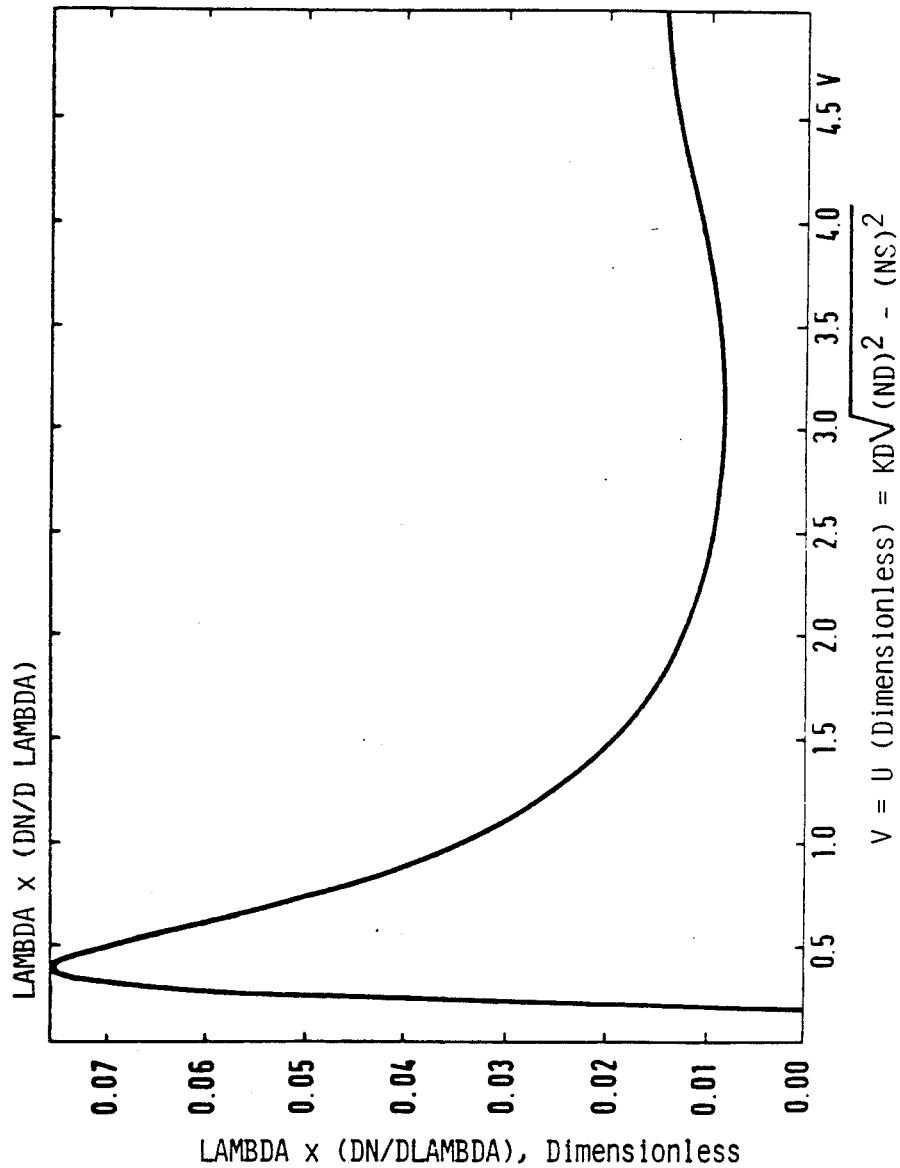
Figure 6:
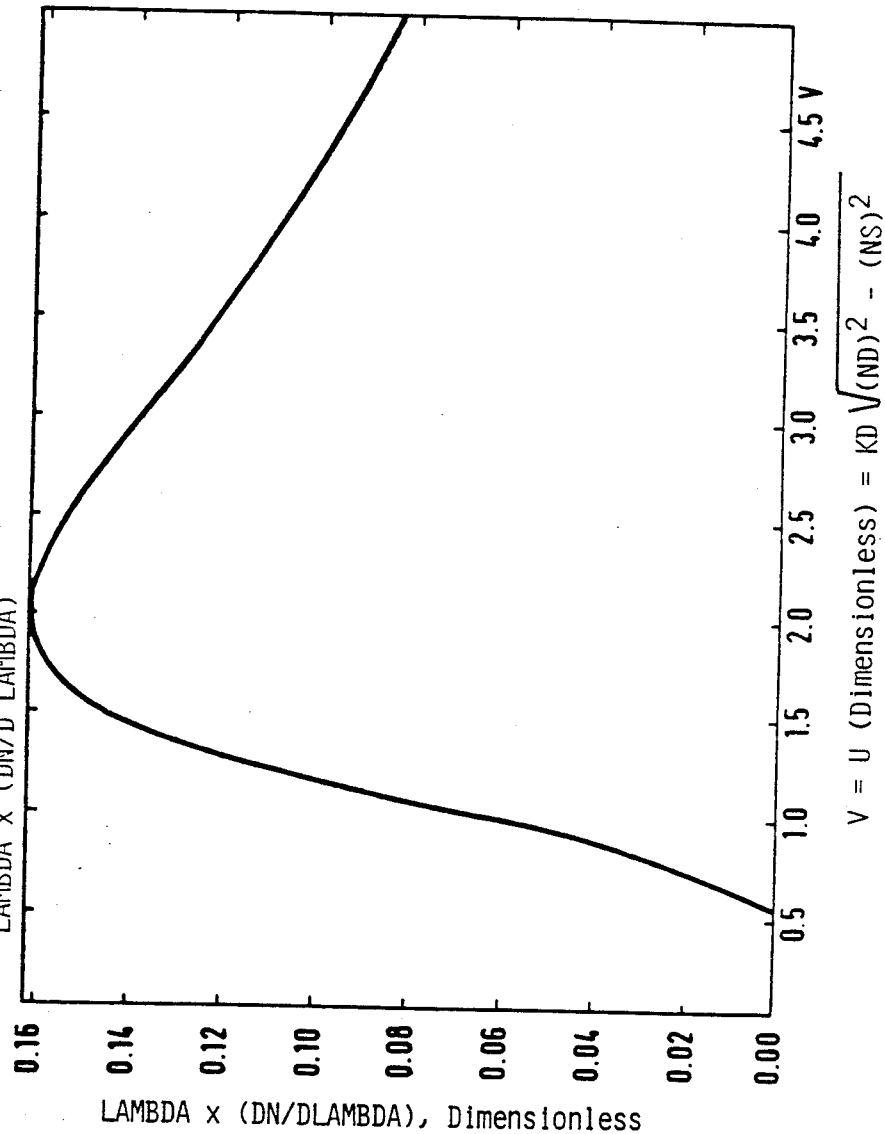

The basic film F1 with index of refraction $n_1 = N1 = 1.41$ and the thickness $a = 4.1\ \lambda$ has an effective index of refraction $n_{eff1} = 1.407$ for the fundamental wave. According to the invention the lens-film is designed to have low dispersion, i.e. with V=3 in FIG. 5 the dispersion is $\lambda dn_{eff}/d\lambda = 0.01$ while the effective index of refraction for the fundamental filmwave is $n_{eff1} = 1.51$. To obtain these characteristics, the coating with $n_{1d} = ND = 1.53$ should have the thickness $d_1 = D = 0.8\ \lambda$ and the underlying film with $n_{fl} = 1.51$ has the thickness $a_1 = A = 5\ D = 4\ \lambda$. For the prism P1 to be used for spectral decomposition of the through passing wave, a high dispersive structure according to FIG. 6 is chosen. If the coating with an index of refraction $n_d = ND = 1.68$ has the thickness $d_p = D = 0.34\ \lambda$ and if the remaining underlying film has the thickness $a_p = A = 10\ D = 3.4\ \lambda$, then, according to FIG. 6, the parameter V has the value $V=2$ and the dispersion is as high as $\lambda dn_{eff}/d\lambda = 0.16$ in the prism-region. The effective index of refraction in the prism is $n_{effp} = 1.503$.

Figure 4:
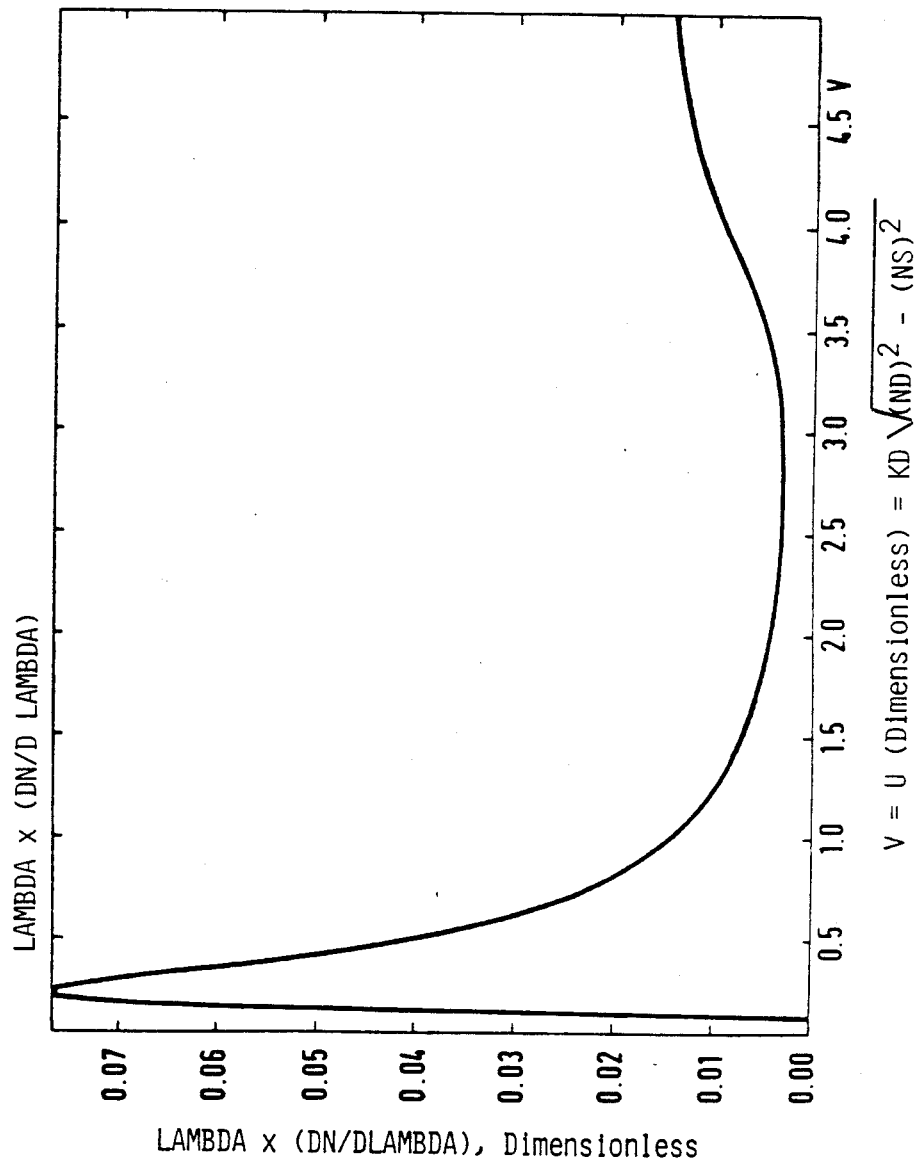
FIGS. 4-6 are diagrams illustrating the behavior of various embodiments of the invention.

Due to the different dimensioning possibilities, it is thus possible to produce a low dispersion waveguide film, for example for use in broadband lenses. FIGS. 4 and 5 show diagrams of the dispersion curves DV of a film structure in dependence on the film parameter V for the fundamental lightwave. The lower portion of each curve shows a relatively broadband range wherein the dispersion has a low, approximately constant value.

This structure is suitable for use as film lens or for a low dispersion film prism in a wave deflector.

If the present invention is to be used for film prisms having high dispersion, the film parameters V of the arrangement are selected so that a highly dispersive film structure results. FIG. 6 shows a dispersion curve which has a broad maximum.

The indices of refraction of the illustrated examples correspond to those of glasses or transparent plastics as they are customarily used for the assembly of such film structures.

The legends employed in the diagrams of FIGS. 4 through 6 have the following meaning:

N1: index of refraction $n_F$ of film F in FIG. 1
ND: index of refraction $n_A$ of coating A in FIG. 1
NS: index of refraction $n_S$ of substrate S in FIG. 1
Film thickness A-thickness of film F in the region below coating A in FIG. 1
Film thickness D-thickness d of coating A in FIG. 1
Lambda: wavelength of the optical radiation in free space
DN/DLAMBDA: derivative of the effective index of refraction N of the fundamental film wave from the wavelength of the optical radiation in free space, the letters D preceding N and LAMBDA indicate the mathematical operation of differentiation film parameter U as defned in FIGS. 4, 5, and 6
KD: wave number times thickness of coating A the wave number is $2\pi$ divided by the wavelength Lambda of the optical radiation in free space.

According to the invention the basic structure of a coated film on a substrate can be designed to have either low or high dispersion. As can be seen from the dispersion characteristics for the specific embodiments of the invention in FIGS. 4 and 5 for low dispersion the film parameter $$V = \frac{2\pi}{\lambda} D \sqrt{n_A^2 - n_S^2}$$

must have values in the range from $2.5 < V < 3.5$ for these embodiments meaning that for the embodiment of FIG. 4 the coating should have a thickness in the range of $$0.6\lambda < D < 0.9\lambda$$

where as the underlying film should be A ten times as thick meaning a film thickness in the range of $$6\lambda < A < 9\lambda.$$

For the embodiment of FIG. 5 in order to achieve the lowest possible dispersion over a wide spectral range the coating should be $D = 0.8\ \lambda$ thick while the underlying film should have a thickness of $A = 5D = 4\ \lambda$.

In contrast to this a design of the basic structure according to the invention for high dispersion requires in general a relatively lower value of the film parameter V. For the specific embodiments the dispersion characteristic of which appears in FIG. 6 the film parameter V should be $V = 2$ meaning that for this embodiment the coating should be $D = 0.34\ \lambda$ thick and the underlying film should have a thickness of $A = 10\ D = 3.4\ \lambda$.

All three embodiments with dispersion characteristics according to FIGS. 4, 5 and 6 respectively have the same refractive index $n_s = 1.4$ of the substrate. The embodiments for low dispersion have a film with the refractive index $n_1 = n_F = 1.51$ and a coating on top of the film with a refractive index $n_D = n_A = 1.53$. In contrast to these index values the embodiment for high dispersion has a film with the lower refractive index of $n_1 = n_F = 1.41$ but a coating with the higher refractive index of $n_D = n_A = 1.68$. Although different in refractive index the substrate as well as the film and coating materials can be made and deposited out of glass with the refractive index adapted to the required values by choosing a suitable mixture of glass constituents.

Figure 7:
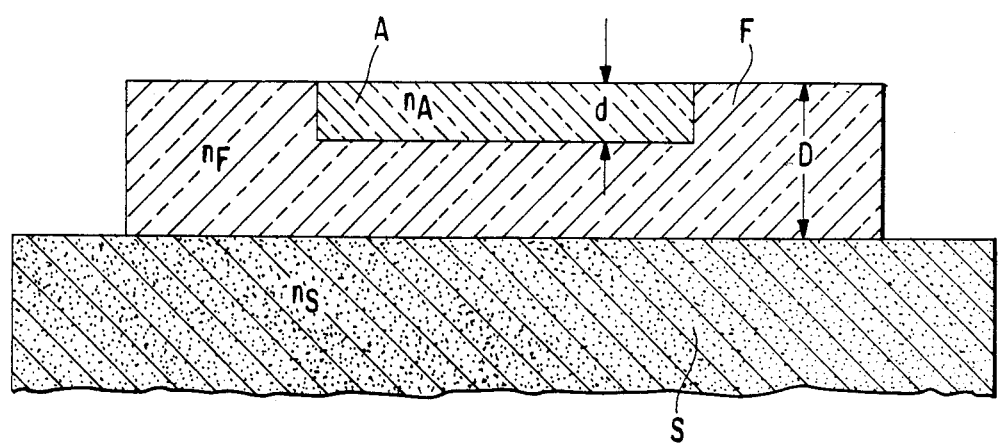
FIG. 7 is a cross-sectional side view of still another preferred embodiment of the invention.

FIG. 7 is a cross-sectional side view of a waveguide film member constructed according to the invention. The film F has a thickness D and an associated index of refraction $n_F$. It is deposited on a substrate S index of refraction $n_S$. The coating A has a thickness d and an index of refraction $n_A$ and is completely embedded into film F, so that the exposed surface of coating A is flush, i.e. its surface forms a continuous plane with the surface of film F.

It will be understood that the above description of the present invention is susceptible to various modifications, changes and adaptations, and the same are intended to be comprehended within the meaning and range of equivalents of the appended claims.

What is claimed is:

1. Planar waveguide film structure for propagating light waves in an integrated optical system, comprising:

a carrier substrate having a first index of refraction $n_S$;
a film having a second index of refraction $n_F$ greater than the first index of refraction applied onto said substrate for substantially guiding the light waves being propagated in said structure; and an optically effective coating applied to said film, said coating having an index of refraction $n_A$ and forming with the portion of said film therebelow an optical component, wherein:
  $n_S = 1.4$;
  $n_F = 1.51$;
  $n_A = 1.53$;
  the ratio of the thickness of said coating to the thickness of said portion of said film is 1:10; and
  the thickness of said coating is approximately 0.65 times $\lambda$, where $\lambda$ is the free space wavelength of the light waves to be guided by said structure;
so that at $$\frac{2\pi}{\lambda} \cdot d \sqrt{(n_A)^2 - (n_S)^2} \approx 2.7,$$

where d is the thickness of said coating, said optical component has a minimum dispersion value.

2. Structure as defined in claim 1 wherein said coating is embedded completely in said film.

3. Structure as defined in claim 1 wherein said coating is partially embedded in said film to a depth of approximately 50% of the thickness of said coating.

4. Structure as defined in claim 1 wherein said coating is localized to be disposed on only a portion of said film.

5. Structure as defined in claim 4 wherein said coating has the form of a lens.

6. Structure as defined in claim 4 wherein said coating has the form of a prism.

7. Planar waveguide film structure for propagating light waves in an integrated optical system, comprising:
a carrier substrate having a first index of refraction $n_S$;
a film having a second index of refraction $n_F$ greater than the first index of refraction applied onto said substrate for substantially guiding the light waves being propagated in said structure; and an optically effective coating applied to said film, said coating having an index of refraction $n_A$ and forming with the portion of said film therebelow an optical component, wherein:
  $n_S = 1.4$;
  $n_F = 1.51$;
  $n_A = 1.53$;
  the ratio of the thickness of said coating to the thickness of said portion of said film is 1.5; and
  the thickness of said coating is approximately 0.8 times $\lambda$, where $\lambda$ is the free space wavelength of the light waves to be guided by said structure;
so that at $$\frac{2\pi}{\lambda} \cdot d \sqrt{(n_A)^2 - (n_S)^2} \approx 3.0,$$

where d is the thickness of said coating, said optical component has a minimum dispersion value.

8. Structure as defined in claim 7 wherein said coating is embedded completely in said film.

9. Structure as defined in claim 7 wherein said coating is partially embedded in said film to a depth of approximately 50% of the thickness of said coating.

10. Structure as defined in claim 7 wherein said coating is localized to be disposed on only a portion of said film.

11. Structure as defined in claim 10 wherein said coating has the form of a lens.

12. Structure as defined in claim 10 wherein said coating has the form of a prism.

13. Planar waveguide film structure for propagating light waves in an integrated optical system, comprising:
a carrier substrate having a first index of refraction $n_S$;
a film having a second index of refraction $n_F$ greater than the first index of refraction applied onto said substrate for substantially guiding the light waves being propagated in said structure; and an optically effective coating applied to said film, said coating having an index of refraction $n_A$ and forming with the portion of said film therebelow an optical component, wherein:
  $n_S = 1.4$;
  $n_F = 1.41$;
  $n_A = 1.68$;
  the ratio of the thickness of said coating to the thickness of said portion of said film is 1:10; and
  the thickness of said coating is approximately 0.34 times $\lambda$, where $\lambda$ is the free space wavelength of the light waves to be guided by said structure;
so that at $$\frac{2\pi}{\lambda} \cdot d \sqrt{(n_A)^2 - (n_S)^2} \approx 2.0,$$

where d is the thickness of said coating, said optical component has a maximum dispersion value.

14. Structure as defined in claim 13 wherein said coating is embedded completely in said film.

15. Structure as defined in claim 13 wherein said coating is partially embedded in said film to a depth of approximately 50% of the thickness of said coating.

16. Structure as defined in claim 13 wherein said coating is localized to be disposed on only a portion of said film.

17. Structure as defined in claim 16 wherein said coating has the form of a lens.

18. Structure as claimed in claim 16 wherein said coating has the form of a prism.

* * * * *